United States Patent
Kumasaka et al.

[11] Patent Number: 5,157,569
[45] Date of Patent: Oct. 20, 1992

[54] THIN FILM MAGNETIC HEAD

[75] Inventors: Noriyuki Kumasaka, Ome; Kenkichi Inada, Katsuta; Ikuo Shinta, Katsuta; Sigeo Imai; Souzou Sasajima, both of Ibaraki, all of Japan

[73] Assignee: Hitachi, Ltd., Tokyo, Japan

[21] Appl. No.: 704,226

[22] Filed: May 22, 1991

[30] Foreign Application Priority Data

May 25, 1990 [JP] Japan ................... 2-133793

[51] Int. Cl.⁵ ............... G11B 5/187; G11B 5/31
[52] U.S. Cl. ................... 360/126; 360/119; 360/122
[58] Field of Search ............... 360/126, 122, 119

[56] References Cited

U.S. PATENT DOCUMENTS

| | | | |
|---|---|---|---|
| 4,656,547 | 4/1987 | Kumasaka et al. | 360/126 |
| 4,819,113 | 4/1989 | Kubota et al. | 360/126 |
| 4,866,555 | 9/1989 | Inagoya et al. | 360/126 |
| 4,916,563 | 4/1990 | Kawase | 360/122 |
| 4,969,253 | 11/1990 | Ota et al. | 360/122 |
| 4,985,796 | 1/1991 | Imara et al. | 360/122 |
| 5,031,063 | 7/1991 | Hasegawa | 360/126 |

Primary Examiner—Robert S. Tupper
Attorney, Agent, or Firm—Antonelli, Terry, Stout & Kraus

[57] ABSTRACT

A magnetic head having a pair of nonmagnetic core base bodies coupled to each other in such a manner that amorphous magnetic alloy films are applied to their abutment surfaces and a gap layer is interposed in a magnetic gap of the head, the films applied to the bodies being made abut against each other at their end edge surfaces each of which has a width larger than its film thickness, and at least one of the bodies having a coil winding groove formed at a portion at which the bodies are coupled to each other. Surface layer portions of each of the bodies, with which a magnetic tape comes into contact, are removed along a direction in which the magnetic tape moves, to a depth which is substantially the same as the depth of the gap while leaving a widthwise portion, which is the same as the track width defined by the width of contact between the two end edge surfaces of the films, at the widthwise center of the bodies, two recesses which are formed by removing the surface layer portions being filled with $2MgO-SiO_2$ or $MgO-SiO_2$, and another amorphous magnetic alloy film is applied to the inner surface of the coil winding groove which defines a coil winding aperture and the latter film is integrally continued to the former films.

2 Claims, 11 Drawing Sheets

FIG. IIA
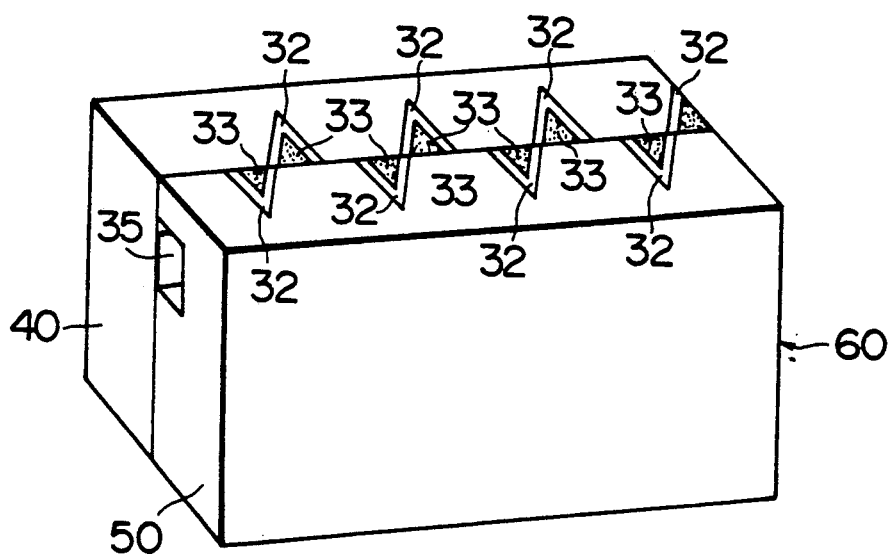
FIG. IIB
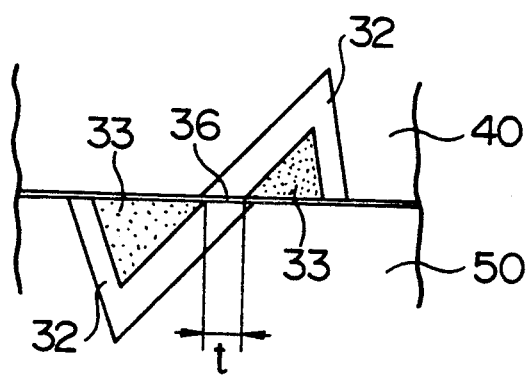
FIG. 12
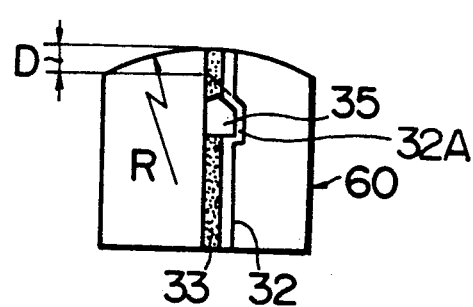

THIN FILM MAGNETIC HEAD

BACKGROUND OF THE INVENTION

1. Field of the Invention

The present invention relates to a magnetic head for recording/reproducing information to and from a magnetic recording medium, and more particularly, to a magnetic head adapted to a large coercive force medium for use in video tape recorders (VTR) or digital audio tape recorders (DAT).

2. Description of the Related Art

A fact has been well known that it is advantageous for a high density magnetic recording/reproducing apparatus to enlarge the coercive force (Hc) of a magnetic recording medium for use therein. Accordingly, a ferrous alloy powder tape, the Hc of which is 1200 to 1500 oersted (Oe), has been used in VTRs recently. In order to record/reproduce a signal to/from a high Hc tape of the type described above, JP-A-58-155513 and JP-A-60-32107 each proposed using magnetic heads with a metal magnetic material of a highly saturated flux density such as Fe-Si-Al (Sendust alloy) and an amorphous Co-Nb-Zr alloy.

In particular, the width of the recording track to be recorded on the magnetic recording medium has been reduced with the recent desire of raising the density of magnetic recording. Accordingly, there arises a desire of significantly reducing the track width of the magnetic head.

Therefore, composite type magnetic heads have been proposed in JP-A-62-138110 and JP-A-62-157306 each of which is arranged in such a manner that magnetic cores are made of a ferromagnetic oxide such as ferrite, and that a ferromagnetic metal film is applied to the surface regions of the magnetic cores between which a magnetic gap is formed.

The above-described magnetic head is, as shown in FIG. 15, constituted in such a manner that abutment surfaces of a pair of magnetic cores 101 and 102 are respectively diagonally cut off, with the magnetic cores 101 and 102 being made of ferromagnetic oxide such as Mn-Zn ferrite. The surfaces 103 and 104 are formed before ferromagnetic metal films 105 and 106 made of, for example, an Fe-Al-Si alloy (Sendust alloy) are applied to the surfaces of thus formed diagonal surfaces 103 and 104 by a vacuum process of forming thin film. The end edge surfaces of the ferromagnetic metal films 105 and 106 are disposed in opposition to each other so that a magnetic gap 107 is formed. Furthermore, low melting point glass materials 108 and 109 or high melting point glass materials 110 and 111 are filled in a track width restricting groove formed by the abutment of the cores 101 and 102 against each other in order to prevent wear.

An example of a method of manufacturing the conventional composite type magnetic head will now be described with reference to the drawings in accordance with its sequential order.

As shown in FIGS. 16A and 16B, a plurality of parallel cut grooves 121, each of which has a substantially V-shaped cross section, are formed on the upper surface side 120a of an oxide magnetic substrate 120 made of, for example, Mn-Zn ferrite, using a rotary grindstone. That is, the parallel grooves 121 are formed on the overall width of the joining surface of the substrate 120 for making magnetic core half bodies abut against each other. As a result, surfaces 121a, on which a thin magnetic film is formed, are formed.

Then, as shown in FIG. 17, an Fe-Al-Si alloy or an amorphous alloy coating is applied to the entire surface of the top surface 120a of the substrate 120 including the surfaces 121a by utilizing a vacuum thin film forming process such as a sputtering process so that a thin magnetic metal film 122 is formed on the substrate 120.

Subsequently, a nonmagnetic material 123 is filled in the V-shaped grooves 121 to which the film 122 is applied. Then, the top surface 120a, with the film 122, of the substrate 120 is ground to be flat so that a desired surface exhibiting an excellent smoothness is formed (see FIGS. 18A and 18B). Furthermore, end edge surfaces 122a of the magnetic film 122 appear on the top surface of the substrate 120.

Then, as shown in FIGS. 19A and 19B, second cut grooves 124 having substantially circular-arc shaped cross sections are, in parallel to the first cut grooves 121, formed by cutting in the portions adjacent to the surfaces 121a on which the magnetic film 122 is applied. In a case where the thickness of the magnetic metal film 122 is substantially the same as the track width Tw, the second cut grooves 124 having the substantially circular-arc shaped cross sections are formed by cutting so as to reach the end edge portions of the film 122 (see FIG. 19B).

Furthermore, a groove 125 is formed on a magnetic core block 140 which is a component of a pair consisting of magnetic core blocks 130 and 140 manufactured by the above-described process, the groove (coil winding groove) 125 being formed perpendicularly to the first and second cut grooves 121 and 124 as shown in FIG. 20, which is one for winding a coil wire in a final product.

Then, coatings as gap spacers are effected on joining surfaces 130a of the magnetic core block 130. Furthermore, the blocks 130 and 140 are coupled to each other in such a manner that the end edge surfaces 122a of the films 122 abut against one another. The blocks 130 and 140 are, then, coupled to each other by using molten glass and nonmagnetic material is filled within each of the second cut grooves 124.

Finally, a plurality of head chips are obtained by slicing, as designated by lines A—A and A'—A' in FIG. 21, before the surface, with which a magnetic tape comes i in contact, is ground to form a cylindrical shape. As a result, a plurality of magnetic head cores 150 are produced (see FIGS. 22 and 23).

The magnetic head shown in FIG. 15 is produced in such a manner that a process of forming the first grooves in the substrate made of, for example, the ferromagnetic oxide, is performed so that inclined surfaces, which correspond to the thin ferromagnetic film formed surfaces, are formed. Next, the thin ferromagnetic metal film is formed on the inclined surfaces before it is ground to form a flat surface. Then, each of the second grooves is formed so that a desired track width is established by depending upon the accuracy of the position of the second groove.

However, the above-described method encounters a problem in that the accuracy of the track width become excessively non-uniform because it depends upon the pitch accuracy of the first grooves, that of the second grooves and the accuracy in the manufacturing processes arranged to be performed to the grinding process. For example, the variation of the first groove positions is about 5 to 7 μm, that of the thickness of the ferromagnetic metal film is about 2 to 4 μm and that of the second grooves is about 2 to 3 μm. Therefore, it is difficult to realize the allowable total variation of the track width of ±1 μm or ±2 μm between each of the final products of the magnetic heads. Furthermore, in a case of a narrow track smaller than 20 μm, a strict accuracy is required in the operation of abutting a pair of magnetic cores such that each of magnetic gaps is formed.

Another problem resides in that a satisfactory manufacturing yield cannot be obtained due to the generation of bubbles in the two processes in each of which glass is filled and due to the too complicated manufacturing process. Furthermore, since a multiplicity of materials are employed to form the magnetic head, an nonuniform wear takes place in the surface with which a magnetic tape comes in contact. As a result, the characteristics of the magnetic head will deteriorate.

On the other hand, it has been known that composite type magnetic heads of the above-described type (which are magnetic heads arranged in such a manner that the magnetic cores are made of a ferromagnetic oxide such as ferrite and a ferromagnetic metal film is applied to the surface region of each of the magnetic cores in which the magnetic gap is formed) and also disclosed in JP-A-62-138110 and JP-A-62-157306 exhibit an advantage in that noise generation due to the contact with a magnetic tape can be relatively reduced in comparison to a magnetic head made of only ferromagnetic oxide. However, the composite type magnetic head involves a problem in that noise caused from the ferromagnetic oxide cannot be satisfactorily reduced because its cores made of ferromagnetic oxide come in contact with a magnetic tape.

SUMMARY OF THE INVENTION

Thus, an object of the present invention is to provide a magnetic head and a method of manufacturing the same with which noise generation due to contact with a magnetic tape can be satisfactorily reduced, the track width accuracy can be improved and its variation between each of produced magnetic heads can be significantly prevented. Furthermore, it is an object of the present invention to provide a manufacturing method with which the deterioration in the manufacturing yield can be prevented and thereby an excellent productivity can be realized by preventing the ununiform wear and by simplifying the manufacturing process.

The above-described object can be achieved by a magnetic head having a pair of nonmagnetic core base bodies coupled to each other in such a manner that amorphous magnetic alloy films are applied to their abutment surfaces and a gap member is interposed in a magnetic gap portion of the magnetic head. The amorphous magnetic alloy films applied to the core base bodies abut against each other at their end edge surfaces each of which has a width larger than its film thickness. At least one of the core base bodies has a coil winding groove formed at a portion at which the nonmagnetic core base bodies are coupled to each other. The surface layer of each of the core base bodies, with which a magnetic tape comes in contact, is removed along a direction in which the magnetic tape moves to a depth which is substantially the same as the depth of the magnetic gap while leaving a widthwise portion, which is the same as the track width defined by the width of contact between the two end edge surfaces of the amorphous magnetic alloy films, at the widthwise center of the core base bodies. The portion which is formed by removing the surface layer is filled with forsterite ($2MgO-SiO_2$) or steatite ($MgO-SiO_2$), and another amorphous magnetic alloy film is applied to the surface of the coil winding groove which defines a coil winding aperture and the amorphous magnetic alloy films are integrally continued to the amorphous magnetic alloy films applied to the abutment surfaces.

The nonmagnetic material for forming the core base bodies is selected from a group consisting of $\alpha$-$Fe_2O_3$, $MnO-NiO$ system, $TiO_2-NiO$ system, $MgO-NiO$ system and $CaO-3TiO_2$.

Materials used for making the magnetic head are selected taking into consideration the coincidence of the thermal expansion coefficients between the materials, the adaptability to a magnetic tape which comes in contact and wear resistance properties.

The magnetic head according to the invention and having the structure mentioned above is manufactured by the following method comprising the steps of:

a. preparing a pair of rectangular parallelepiped blocks made of nonmagnetic materials, from which a plurality of nonmagnetic core base bodies are finally obtained by cutting;

b. forming a plurality of parallel grooves on a flat surface of each of the blocks at the same interval, with each of the parallel grooves having inclined surfaces which are connected to the flat surface;

c. forming a coil winding groove on the flat surface of at least one of the blocks, with the coil winding groove perpendicularly crossing the plurality of parallel grooves having the inclined surfaces;

d. applying a magnetic metal film is to the flat surface, inner surfaces of the parallel grooves and inner surfaces of the coil winding grooves;

e. filing glass into a plurality of parallel grooves to which the magnetic metal film has been applied;

f. grinding the surface of the block with the grooves so that excessive glass and magnetic film metal are removed;

g. abuting end edge surfaces of the magnetic metal films against each other, via gap between the both blocks so as to be coupled to each other whereby a joined block is formed;

h. forming the surface, with which a magnetic tape comes into contact, to have a cylindrical shape;

i. after forming the cylindrical shape removing, surface layers, with which a magnetic tape comes into contact, in a direction along which the magnetic tape moves to a depth which is substantially the same as the depth of the magnetic gap while leaving a plurality of magnetic gap portions, with the width of each of the gap portions being the same as the track width defined by the width of contact between the two end edge surfaces of the amorphous magnetic alloy films so that parallel recesses are formed;

j. filling the recesses with one of forsterite ($2MgO-SiO_2$) and steatite ($MgO-SiO_2$); and k. cutting the joined block in such a manner that the forsterite ($2MgO-SiO_2$) portions or steatite ($MgO-SiO_2$) portions in the recesses formed in the surface layer of each of the magnetic head cores, with which the magnetic tape comes into contact, are present on the both sides of the two magnetic film end edge surfaces which define the track width, so that a plurality of magnetic head core elements are obtained.

It is preferable that forsterite (2MgO—SiO$_2$) or steatite (MgO—SiO$_2$) is filled into the recesses by a sputtering or a vacuum deposition process.

It is also preferable that the step of filling the recess is performed after a nonmagnetic metal films have been formed on the inner surfaces of the recesses formed in the step of removing the surface layers in order to improve the connectivity between the magnetic metal film and forsterite (2MgO—SiO$_2$) or steatite (MgO—SiO$_2$) filled in the recesses and/or prevent reactions between the nonmagnetic core base bodies and the filled material.

According to the present invention, the first parallel grooves having the surfaces inclined with respect to the abutment surfaces of the two core base body blocks are formed. Furthermore, the magnetic metal film is formed on the surfaces of the thus formed grooves before the two core base bodies are coupled to each other via the gap material. The track width portion can be then formed on the surface of the magnetic core with which the magnetic tape comes into contact. As a result, the positional deviation of the groove pitch, which will take place due to the wear of the grindstone and the error in the track position which is caused from variation of the film thickness of the magnetic metal film, can be prevented. Furthermore, since the thickness of the magnetic metal film is made to be larger than the track width, a deviation to a certain extent can be overcome, even if the deviation takes place in the gap abutment process.

Furthermore, the ceramics, that is, forsterite or steatite, is filled into the recesses formed on the both sides of the track after the track width portion has been formed as described above. Therefore, the generation of bubbles and the breakage and chipping at the time of the cutting work to form the core shape can be satisfactorily prevented in comparison to the structure in which glass or the like is filled. In particular, since forsterite (2MgO—SiO$_2$) and stealite (MgO—SiO$_2$) has substantially the same thermal expansion coefficient as that of the material such as $\alpha$—Fe$_2$O$_3$ which is employed to make the core base body a problem of breakage or peeling of the filler can be overcome. In addition, since it can be rather easily worn in comparison to the core base body when the magnetic tape slides on them, an excellent tape touch can be obtained while preventing non-uniform wear.

The nonmagnetic core base bodies which constitute a portion of the magnetic head according to the present invention, the amorphous magnetic alloy film and the above mentioned ceramics to be filled taking into the recesses are selected in consideration of their adaptability in the thermal expansion coefficient, the hardness and the wear resistance. The thermal expansion coefficients required for the materials and the hardness are as shown in the following table:

| Material for magnetic head | Characteristics | |
|---|---|---|
| | Thermal expansion coefficient ($\times 10^{-7}$/°C.) | Hardness (kg/mm) |
| Core base body | 115 to 120 | 500 to 800 |
| Amorphous alloy film | 118 to 120 | 850 to 900 |
| Ceramics | 90 to 120 | 500 to 800 |

Furthermore, the generation of the cross-talk from the adjacent tracks or the next tracks to the adjacent track due to the undesirable presence of the magnetic metal film exceeding the track width of the surface of the magnetic head, with which the magnetic tape comes into contact, can be prevented, because the structure of the invention magnetic head is arranged in such a manner that track width forming work is performed to the surface with which the magnetic tape comes into contact. Thus, a magnetic head exhibiting excellent recording/reproducing characteristics can be obtained.

Even if it is formed of a complicated shape, its magnetic characteristics cannot be deteriorated, since the magnetic film according to the present invention is made of an amorphous alloy having no crystalline structure. The nonmagnetic core base body enable the metal tape, which comes into contact with it, to slide on its surface while exhibiting excellent contact characteristics. Furthermore, the nonmagnetic core base body has a good machinability. Forsterite (2MgO—SiO$_2$) and steatite (MgO—SiO$_2$) is formed by a sputtering or a vacuum deposition process and enables the metal tape, which comes in contact with it, to slide on its surface while exhibiting excellent contact characteristics. It is also noted that no excessive surface level difference will be formed due to contact wearing between the core base body and the above mentioned materials when the metal tape slides on the surface of the materials.

The nonmagnetic core base bodies which constitute the essential portion of the magnetic head according to the present invention, the amorphous magnetic alloy film and the above mentioned ceramics to be filled into the recesses can be evaluated as follows in terms of the magnetic head characteristics:

Magnetic Film: The amorphous alloy has a high saturated flux density and exhibits excellent magnetic recording performance.

Non-magnetic Core Base Body: Noise due to sliding contact with a magnetic tape can be reduced effectively and a high S/N ratio can be obtained.

Forsterite (2MgO—SiO$_2$) and steatite (MgO—SiO$_2$): Since it is formed by a sputtering process, a spacing loss can be reduced.

Other and further objects, features and advantages of the invention will be appear more fully from the following description.

BRIEF DESCRIPTION OF THE DRAWINGS

FIG. 11A is a schematic perspective view of a bonded block obtained by bonding a pair of magnetic core blocks by using bonding glass.

FIG. 11B is an enlarged plan view of the top surface of the bonded block (FIG. 11A) which illustrates a state of the magnetic gap portion and the track width;

FIG. 12 is a cross sectional view of the bonded block (FIG. 11A) which illustrates the top surface being provided with a cylindrical shape, with which a magnetic tape comes into contact;

DETAILED DESCRIPTION

Example 1

Figure 1A:
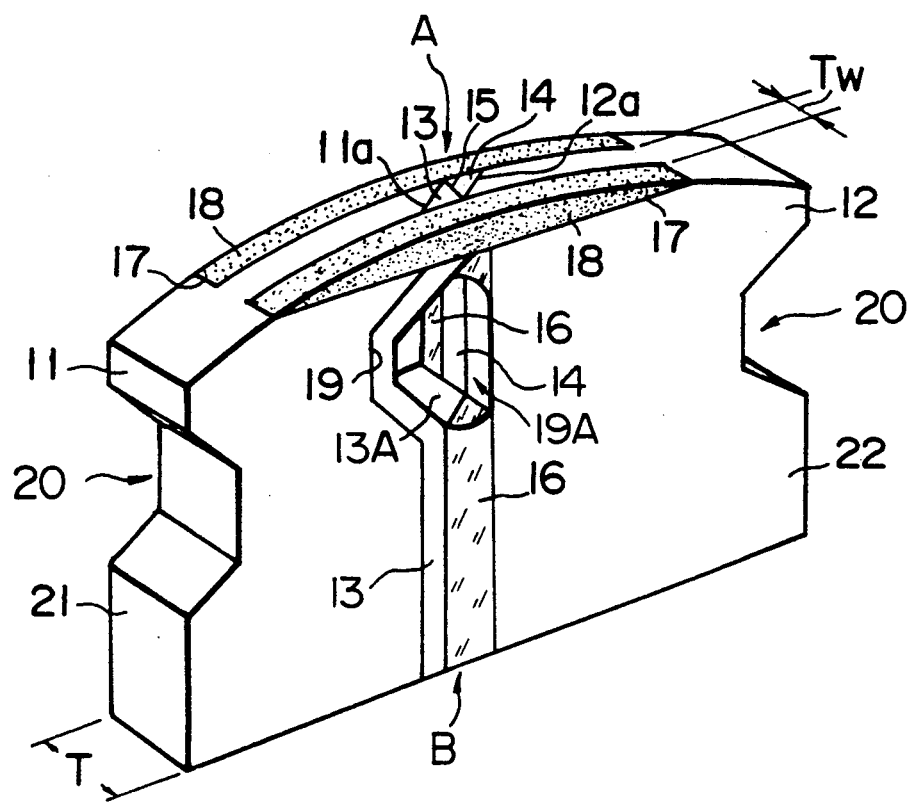
FIG. 1A is a perspective view of a magnetic head according to the invention.
Figure 1B:
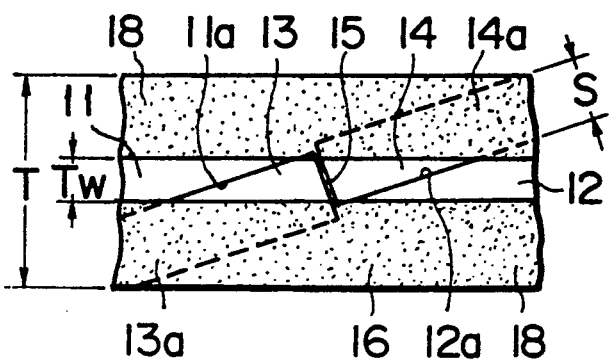
FIG. 1B is an enlarged plan view of portion of the top surface of the head with which a magnetic tape comes into contact.

The magnetic head shown in FIGS. 1A and 1B has core base bodies 11 and 12 made of a nonmagnetic material, for example, $\alpha$—$Fe_2O_3$, MnO—NiO system, $TiO_2$—NiO system, MgO—NiO system, CaO—$3TiO_2$. The bodies 11 and 12 have inclined surfaces 11a and 12a on which magnetic metal films are plated. The films are made of, for example, an amorphous Co-Nb-Zr system alloy film by a sputtering process on the both surfaces from the front abutment portion A, which serves as a magnetic gap, to a rear abutment portion B, and have highly saturated magnetic flux density. The bodies 11 and 12 coated with the magnetic metal films 13 and 14 are hereinafter called as the half bodies 21 and 22.

The upper end surfaces of the films 13 and 14 appear on the top surface (FIG. 1A) in an abutment portion of the half bodies 21 and 22. The films 13 and 14 have thickness S which is larger than track width Tw. With this relationship, an abutment surface larger than the track width Tw can be obtained even if variations to some extent of the thickness of the films take place or positional variations takes place in the abutment of the films. The thus formed pair of the half bodies 21 and 22 are made abut against each other at their metal magnetic films via a $SiO_2$ film or the like formed in the front abutment portion A so that a magnetic gap 15 is formed.

The magnetic core half body 21 has a groove 19 for winding a coil wire. The groove 19 and the side surface of the other magnetic core half body 22 define a coil wire aperture 19A. The inner surface of the groove 19 of the half body 21 is coated with a metal magnetic film 13A which is integrally formed with the film 13. The both half bodies 21 and 22 are also bonded each other with bonding glass 16.

According to this example, parallel grooves 17 define the track width longitudinally formed on the both side regions in the widthwise direction of the top surface (FIG. 1A) with which the magnetic tape comes into contact while leaving the track width Tw. The thus formed grooves (or recesses) 17 are respectively filled with nonmagnetic ceramic material 18 by which the metal magnetic films 13 and 14 can be protected from wearing.

According to this example, the core base bodies 11 and 12, or the half bodies 21 and 22, are made of nonmagnetic material, and a magnetic-circuit is constituted only by the metal magnetic films 13, 13A and 14. As a result, operation noise, due to sliding contact with a magnetic tape, can be reduced in comparison with the conventional structure in which core base bodies are made of ferrite, causing the S/N (Signal/Noise) ratio to be improved.

In this example, it is preferable that the thickness S of the magnetic film be 30 $\mu$m or more in order to maintain a satisfactory efficiency because the magnetic circuit is constituted only by the magnetic metal films.

According to the example, after the pair of the half bodies are bonded to each other, a track width forming operation is performed on the surface with which a magnetic tape comes into contact. As a result, a desired track width can be accurately established even if the thickness of the metal magnetic films varies or positional variations take place to a certain extent in the abutment of the metal magnetic films. Furthermore, since metal magnetic film 13a and 14a exceeding the track width do not appear on the top surface with which the magnetic tape comes into contact (FIG. 1B), the cross-talk from adjacent tracks or the next tracks to the adjacent tracks can be prevented. Thus, a magnetic head exhibiting excellent recording/reproducing characteristics can be realized. The ceramic material 18 to be filled in the track width defining grooves 17 is selected taking into consideration the coincidence of the thermal expansion coefficients of the core base bodies 11 and 12 and the magnetic metal films 13 and 14, the property of contacting with them, and the wear resistance properties of them and the ceramics.

According to this example, it is arranged that the thermal expansion coefficient of the nonmagnetic material such as $\alpha$-$Fe_2O_3$ to form the core base body is 115 to $120 \times 10^{-7}/°$ C. and the hardness of the same is 500 to 800 kg/mm². The thermal expansion coefficient of the amorphous Co-Nb-Zr alloy film to serve as the magnetic metal film is 118 to $120 \times 10^{-7}/°$ C. and the hardness of the same is 850 to 900 kg/mm². It was found that the ceramic material 18 to be enclosed into the track width defining grooves 17 preferably has a thermal expansion coefficient of 90 to $120 \times 10^{-7}/°$ C. and a hardness of 500 to 800 kg/mm².

Although it is preferable that the thermal expansion coefficient of the ceramic material 18 be substantially the same as that of the material forming the core base body, it was experimentally determined that its lower limit is about $80 \times 10^{-7}/°$ C. In addition, it was found that there is no direct relationship between the hardness and the wear property. However, it has been found from an examination of a variety of ceramic materials that it is preferable that the hardness be 500 to 800 kg/mm². Specifically, it is suitable to form the ceramics 18 as a thin film plated by a sputtering process using forsterite (2MgO—SiO₂) as a target material. The ceramic film 18 thus formed was composed of steatite in main and was amorphous structure. The nonmagnetic protection film 18 easily adheres to the amorphous magnetic alloy films 13 and 14. Furthermore, since it is worn by sliding contact with a magnetic tape slightly faster than wearing of the magnetic core base material, an excellent tape touch can be realized. In addition, ununiform wear due to the difference between the constituent materials was reduced satisfactorily. An additional effect was also obtained in that the gap depth from the top surface (FIG. 1A) of the magnetic head can be easily measured from the side surface of the head because the ceramics was a transparent film.

As shown in FIGS. 1A and 1B, the magnetic head is constituted in such a manner that the top surface, which is in the form of a circular arc and with which a magnetic tape comes into contact, is arranged to have a track width of Tw which is 10 to 25 μm. Furthermore, the surface, with which the tape comes into contact, comprises the magnetic metal films 13 and 14 which are diamond-shaped as a whole, and the Mn-Zn ferrite materials 11 and 12. The ceramic materials 18, are plated on the both side portions of the surface. The core width size T is 120 to 180 μm, and a coil wire is wound by utilizing the coil wire aperture 19 so that the magnetic head as a final product is manufactured. In the magnetic head, the groove 20 serves for fixing the installed coil.

Example 2

Figure 2A:
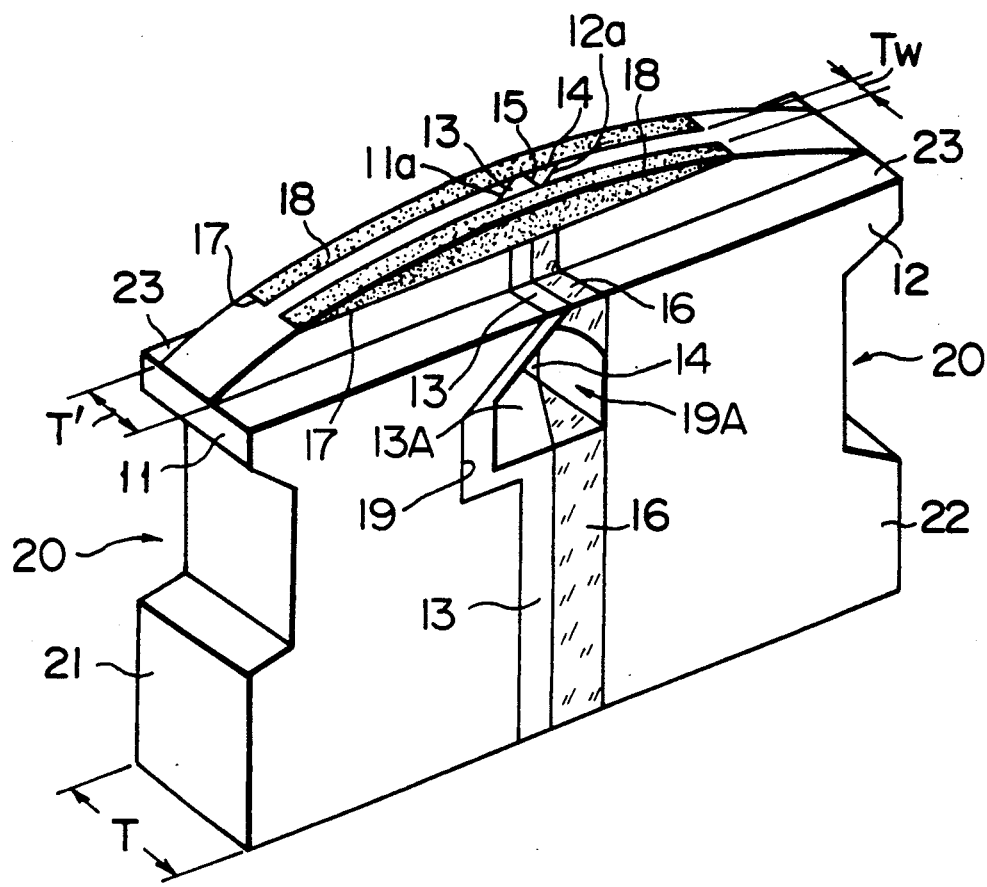
FIG. 2A is a perspective view another example of the magnetic head of the invention.
Figure 2B:
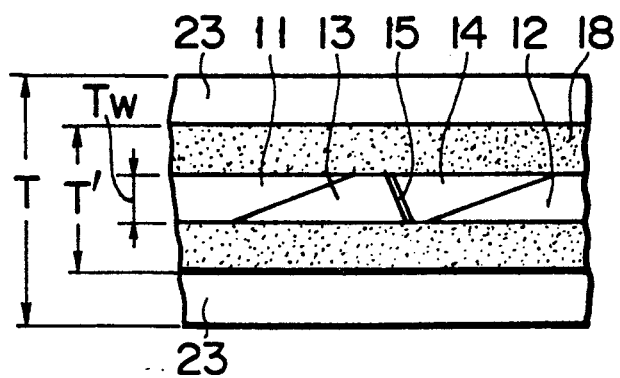
FIG. 2B is an enlarged plan view of a portion of the top surface of the head (in FIG. 2A) with which a magnetic tape comes into contact.

The magnetic head according to this example (FIGS. 2A and 2B) is structured substantially similarly to that of Example 1. The magnetic head is provided with two recesses 23, 23 on both sides of the surface portion with which a magnetic tape comes into contact. In the head, the track width is Tw, the core width of the surface portion is T' and the core thickness as a whole is T. According to the magnetic head of this example, more excellent property of contact with a magnetic tape can be realized. Consequently, the recording/reproducing characteristics are improved. There is no upper limit present in the track width. A lower limit of track width can be about 5 μm in the case where the cutting depth is arranged to be 30 to 50 μm. It is preferable that the core width T' of the surface portion, with which the magnetic tape comes into contact, be 60 to 100 μm. If the core width T' is 60 μm or less, excessive wear takes place between the tape and the head, causing the life of the head to be shortened. If the width T' is 100 μm or more, the tape touch property deteriorates. It is preferable that the core width T as a whole is 120 to 200 μm. If it is less than 120 μm, the magnetic resistance of the magnetic core as a whole is increased excessively, causing the efficiency to be deteriorated and the mechanical strength is also deteriorated. If it is 200 μm or more, the inductance of the core is excessively increased, causing an undesirable result to occur.

Example 3

FIGS. 3 to 6 are respectively enlarged views which illustrate examples of the present invention about the head surface with which a magnetic tape comes into contact.

Figure 3:
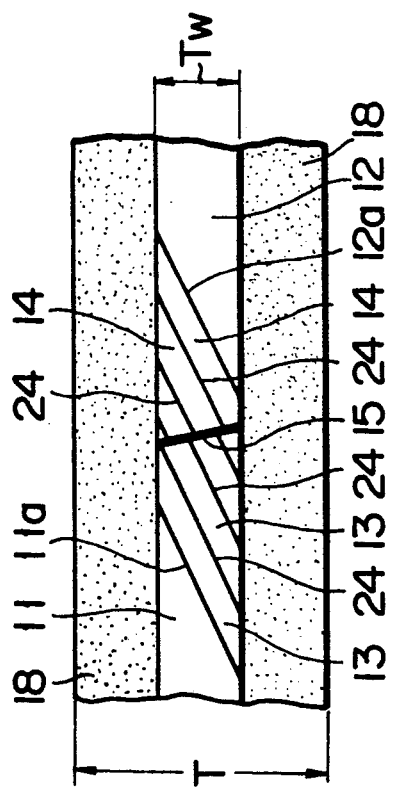

A magnetic head of FIG. 3 includes magnetic metal films 13 (and 14) and a non-magnetic insulator film 24 are alternately layered as to reduce the eddy current loss in the magnetic metal film and thereby improve the further adaptability to high frequency ranges.

Figure 4:
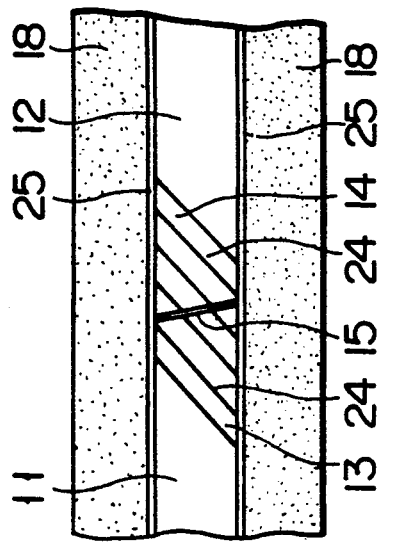
FIGS. 3 to 6 are respectively enlarged plan views of a portion of the top surfaces of other example magnetic heads of the invention with which a magnetic tape head comes into contact.

A magnetic head of FIG. 4 includes a nonmagnetic metal films 25 previously formed on each of the side surfaces of the track width defining grooves before the nonmagnetic ceramic material 18 is enclosed. According to this arrangement, the adhesion property between the magnetic metal films 13, 14 and the ceramic material 18 is improved. Reactions between the both materials can be also satisfactorily prevented.

Figure 5:
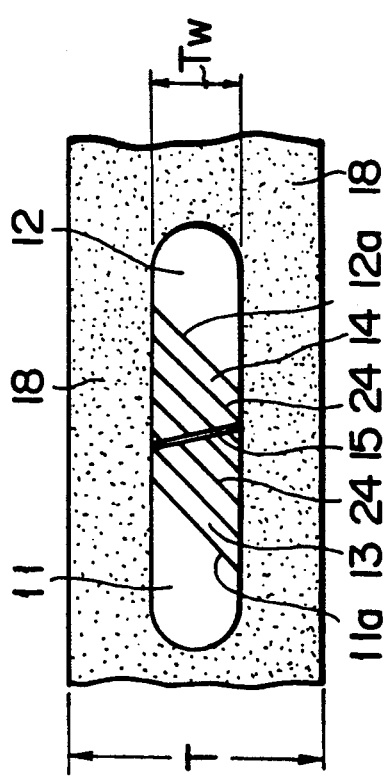

A magnetic head of FIG. 5 includes nonmagnetic ceramics 18 formed on the whole cylindrical surface portion, except for the parts of the magnetic gap 15 and around the gap, with which a magnetic tape comes into contact. The head is produced by a process in which the ceramics 18 is firstly plated on the whole cylindrical surface and thereafter surface parts including the magnetic gap 15 is exposed by tape lapping. According to this arrangement, the property of the sliding contact with a magnetic tape and the wear resistance is improved.

Figure 6:
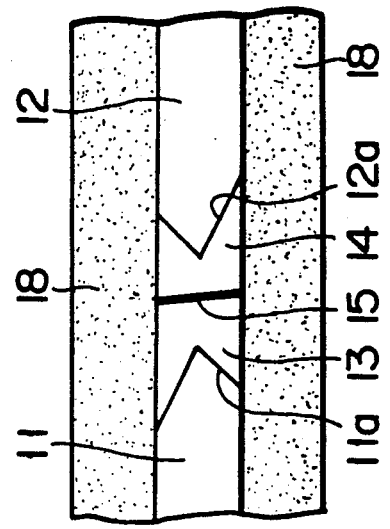

A magnetic head of FIG. 6 includes surfaces 11a and 12a of the base bodies 11 and 12, on which the magnetic metal films 13 and 14 are plated, with the surfaces 11a, 12a being of an angled- or a triangular shaped cross section. As described above, the shape of the included surface of the base body, on, which the magnetic metal film are formed, has many types of variations.

Example 4

Next, an example of a producing method of the magnetic head according to the invention will now be described with reference to FIGS. 7A to 14.

Figure 7A:
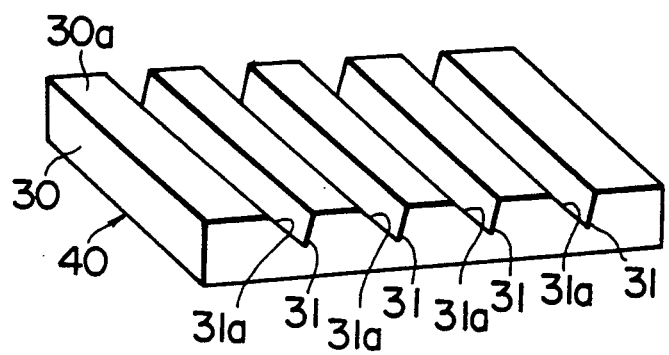
FIG. 7A is a schematic perspective view which illustrates a core base body with substantially V-shaped grooves formed in order to form a magnetic film inclined with respect to the core base body.
Figure 7B:
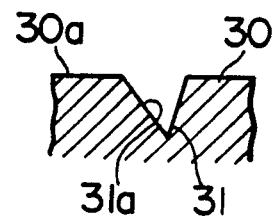
FIG. 7B is an enlarged cross sectional view which illustrates the V-shape of a groove of the body (FIG. 7A)

(i) FIGS. 7A and 7B illustrate a step in which a plurality of cut grooves 31 having a substantially V-shaped cross section are, corresponding to the entire width of a nonmagnetic substrate 30, formed in parallel by a rotary grindstone on the top surface layer of the substrate 30. The substrate 30 is processed so as to form the abovementioned magnetic core half body. As a result, a nonmagnetic core half body block 40 having a plurality of inclined surfaces 31a, on which a thin magnetic film is plated, is obtained.

Figure 8A:
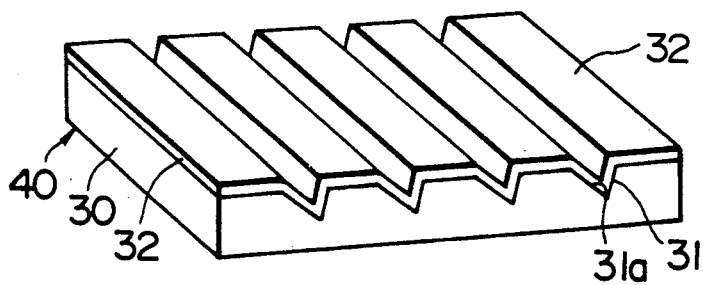
FIG. 8A is a schematic perspective view which illustrates the core base body with a magnetic metal film.
Figure 8B:
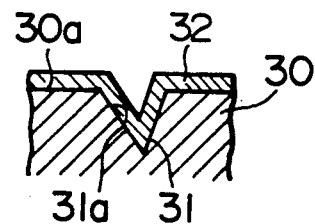
FIG. 8B is an enlarged cross sectional view the inclined film in a V-shaped groove of the body (FIG. 8A)

(ii) FIGS. 8A and 8B illustrate a step in which an Fe-Al-Si system alloy coating, for example, is applied to the entire surface of the top surfaces 30a of the substrate 30 including the surfaces of the grooves 31 by the vacuum thin film forming technology such as a sputtering process so that a magnetic metal film 32 is formed on the substrate 30. The film 32 is made of an amorphous magnetic alloy, for example, an amorphous magnetic metal-metal system alloy comprising at least one element selected from a group consisting of Fe, Co and Ni, and further Zr, Nb, Ta, Hf, Ti, W, Cr and Mo. As an alternative to this, a fine polycrystal alloy composed of an Fe-Si-Al system alloy or an Fe-C-M system alloy, in which M is one of Hf, Zr, Ta, Ti and Nb, is suitable.

Figure 9A:
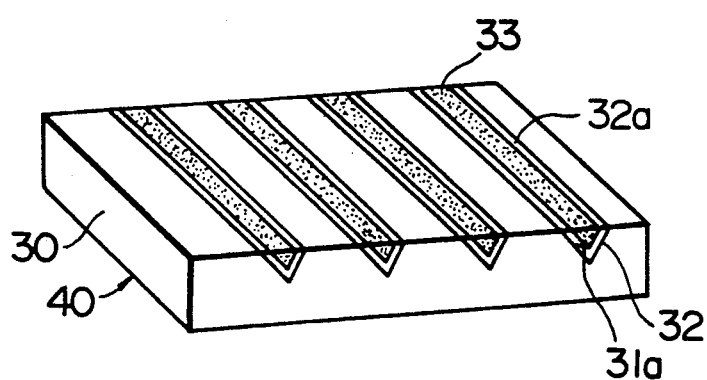
FIG. 9A is a schematic perspective view of the core base body wherein bonding glass is filled within each of the v-shaped grooves with a magnetic metal film, and thereafter parts of the film on the top plane surfaces are removed by grinding and polishing operations.
Figure 9B:
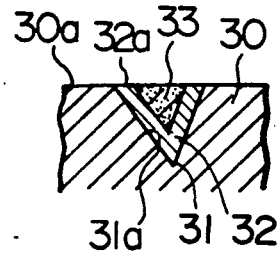
FIG. 9B is an enlarged cross sectional view of the body of FIG. 9A.

(iii) FIGS. 9A and 9B illustrate a step in which molten bonding glass 33 is filled into V-shape grooves 31 coated with the film 32, and thereafter parts of the film 32 on the top surfaces 30a are removed by grinding and polishing operations so that a desired surface 30a exhibiting an excellent smoothness is formed and end edge surfaces 32a of the film 32 to be exposed on the top surface of the substrate 30.

Figure 10:
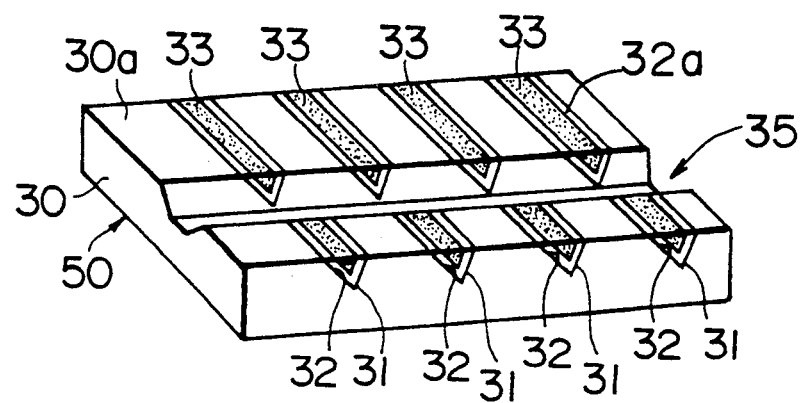
FIG. 10 is a schematic perspective view of the core base body with a coil winding groove.

(iv) FIG. 10 illustrates a step in which a coil wire groove 35 is formed on a nonmagnetic core half body block 50 in a direction perpendicular to the V-shape grooves 31, with the blocks 50 being obtained by processing the block 40. The coil wire groove 35, which is used for winding a coil wire around the block 50, is arranged to be a depth which is deeper than that of the grooves 31. At this time, a part of each of the films 32 plated on the surfaces of the grooves 31 is removed.

Figure 10A:
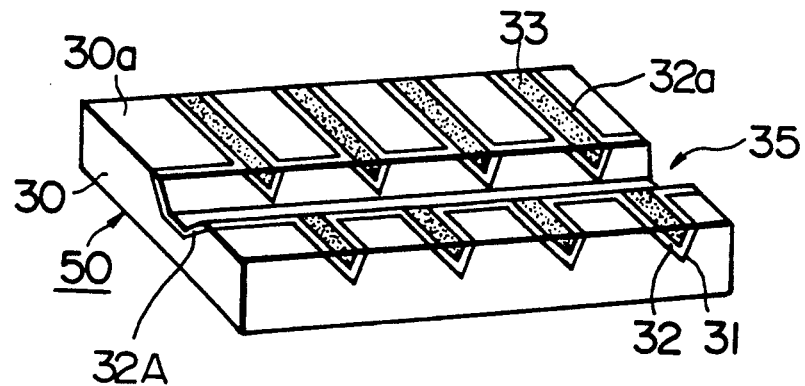
FIG. 10A is a schematic perspective view of the core base body with a magnetic metal film on the coil winding groove.

If this process is performed prior or also after step i, the magnetic metal film can be also formed on the inner surface of the coil wire groove 35 in the step ii as well as the grooves 31. FIG. 10A shows another method in which the magnetic metal film 32A is formed on the inner surface of the groove 35, integrally with the film 32.

Forming the film 32A in the groove 35 is suitable when the core base body is made of a nonmagnetic material. According to this structure, a magnetic circuit is formed of only magnetic metal material.

Next, a thin nonmagnetic film for the magnetic gap is applied to the top surface (FIG. 10A) of at least one of the blocks 40 and 50 manufactured by the above-described processes. For example, one of $SiO_2$, $Al_2O_3$, $ZrO_2$, $TiO_2$ and Cr is plated by a sputtering process.

(v) Subsequently, the blocks 40 and 50 are bonded with each other so that the end edge surfaces 32a of the films 32 are made abut against one another. The blocks 40 and 50 are bonded with each other by the glasses 33 in the grooves 31, so that a bonded block 60 is obtained (FIG. 11A).

If the width t (FIG. 11B) of a magnetic gap 36 is arranged as to be larger than the final track width Tw, the variation in the abutment taken place as shown in FIG. 11B can be allowed.

Figure 14:
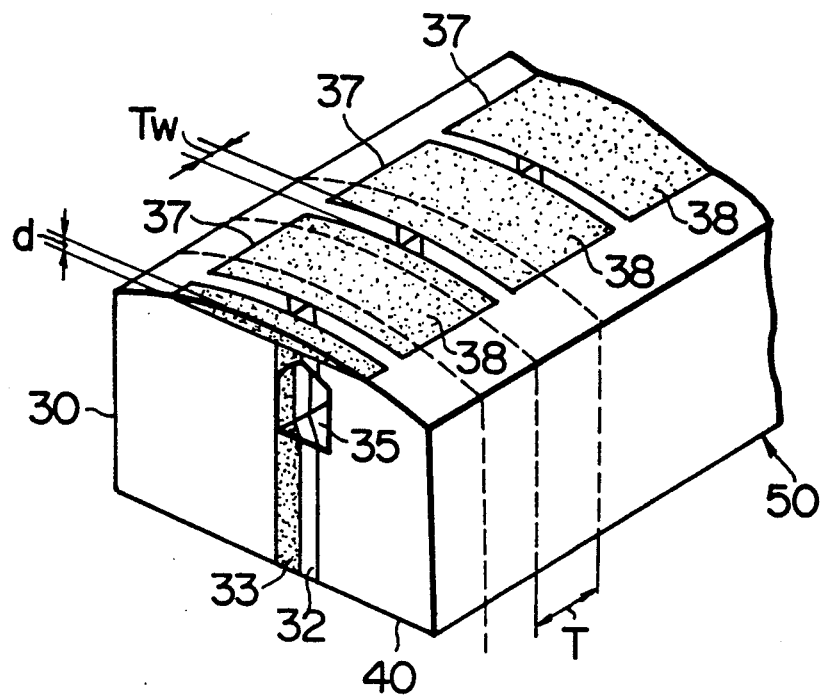
FIG. 14 is a schematic perspective view of the bonded block wherein ceramic material is filled within the recesses formed by removing the surface layer (FIG. 13) and cutting lines for obtaining a plurality of magnetic heads, are indicated with dotted lines.
Figure 15:
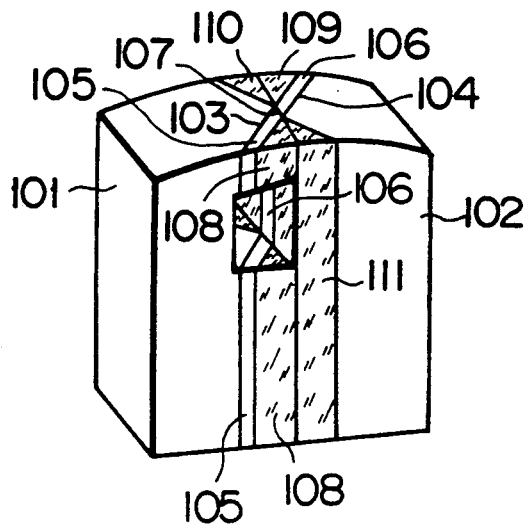
FIG. 15 is a perspective view of a conventional magnetic head.
Figure 16A:
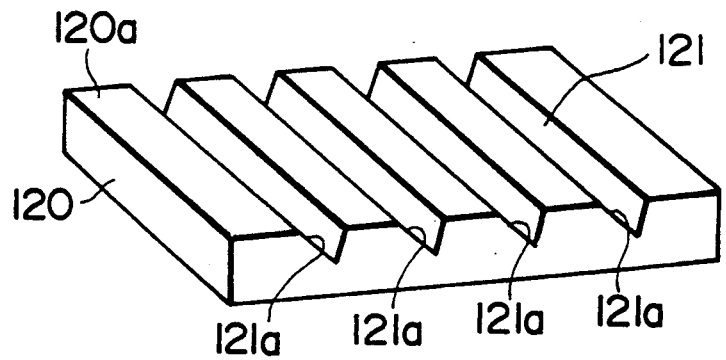
FIGS. 16A to FIG. 23 are schematic views which respectively illustrate sequential steps of a process of manufacturing the conventional magnetic heads.
Figure 16B:
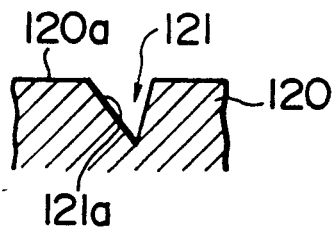
Figure 17:
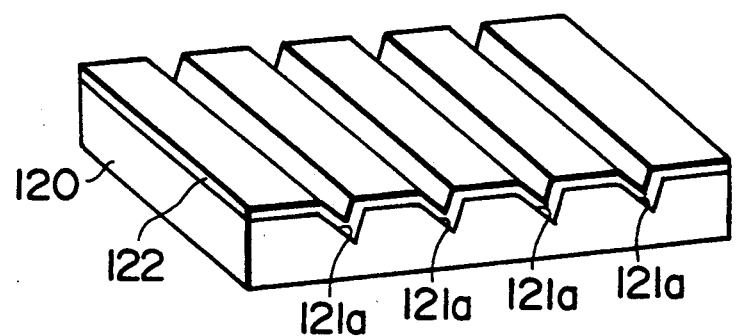
Figure 18A:
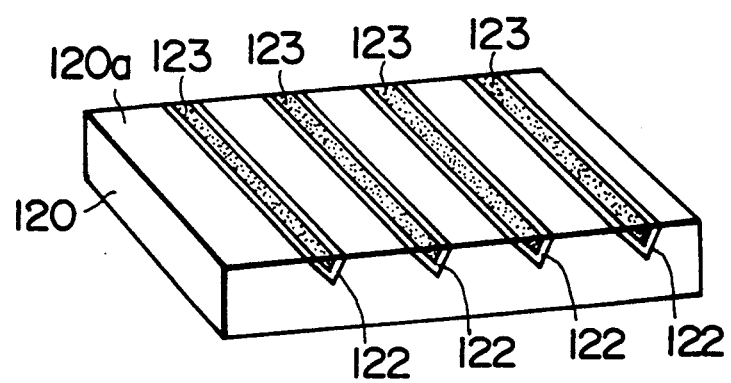
Figure 18B:
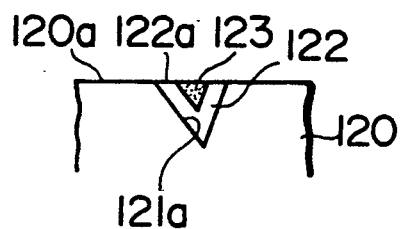
Figure 19A:
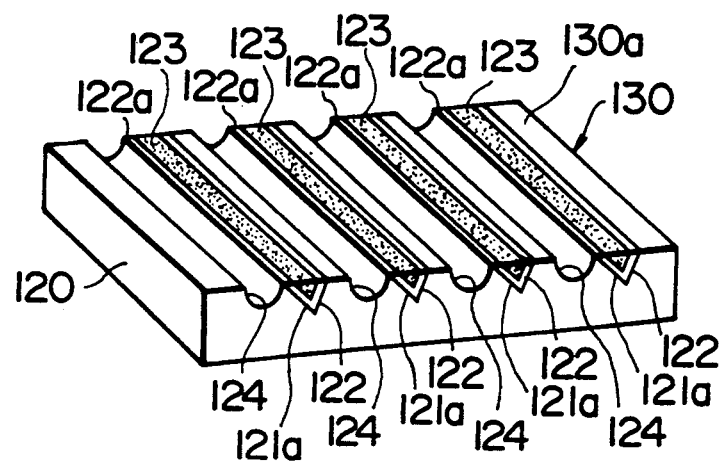
Figure 19B:
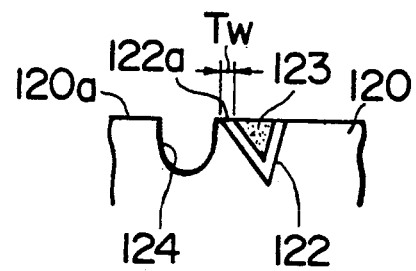
Figure 20:
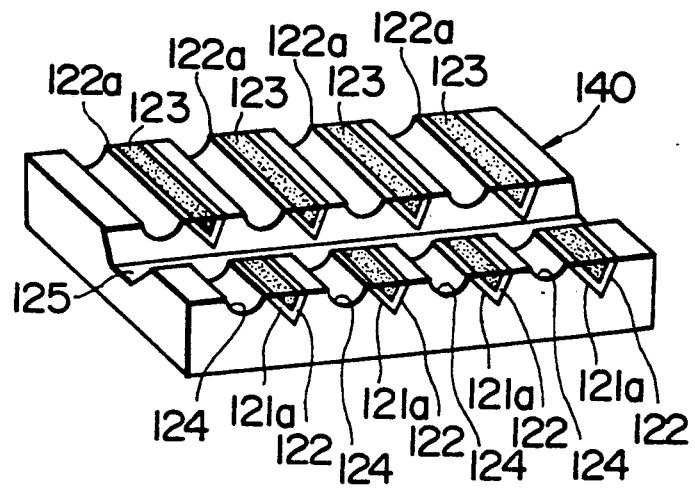
Figure 21:
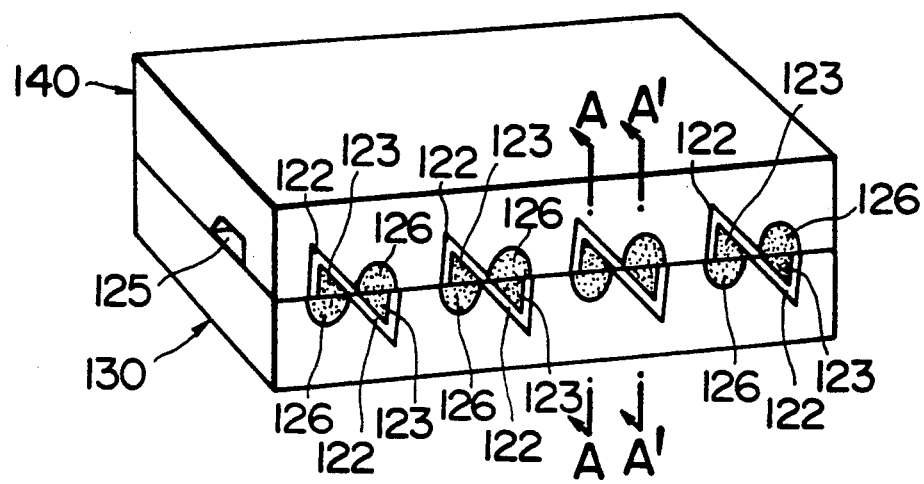
Figure 22:
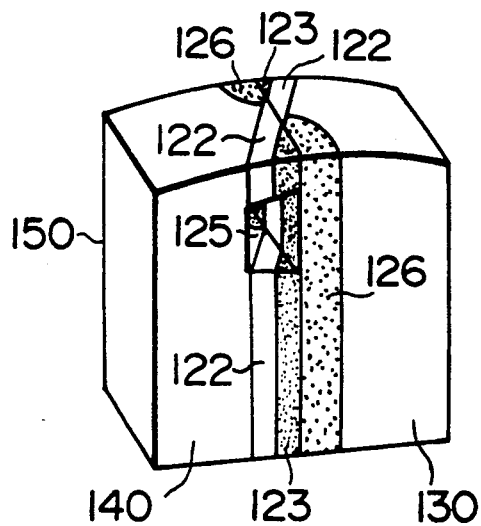
Figure 23:
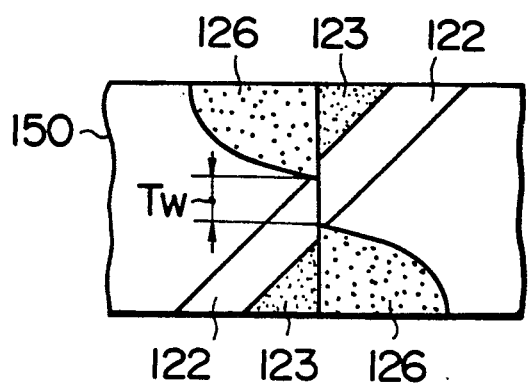

(vi) FIG. 12 illustrates a step in which the surface portion of the bonded block 60, with which the magnetic tape comes in contact, is made to have a cylindrical shape having a height of a predetermined gap depth D. According to this example, the curvature radius R of the cylindrical shape was made to be 4 to 8 mm. Furthermore, the gap depth D was arranged to be slightly larger than the final magnetic gap depth d (FIG. 14). If it is desired to make the depth d to be, for example, 15 μm, it is preferable that the depth D be made to be 30 to 40 μm.

Figure 13:
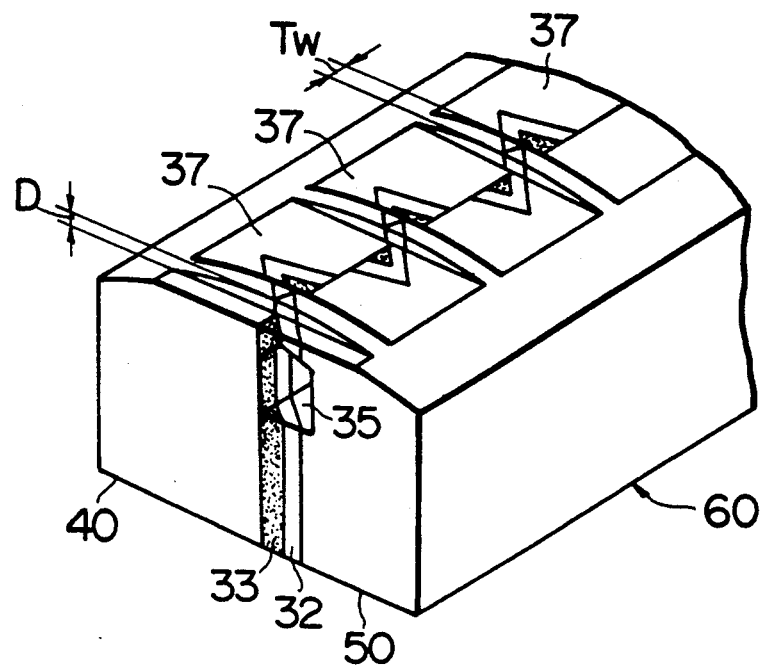
FIG. 13 is a schematic perspective view of the bonded block provided with a predetermined track width on the top surface by removing parts of the top surface layer.

(vii) FIG. 13 illustrates a step in which parallel recesses 37 are formed on the both sides of the magnetic gap portion of the surface of the bended block 60, while leaving a predetermined track width Tw. The depth of the recesses 37 is made to be slightly smaller (several tens of microns) than the gap depth D in this phase.

(viii) FIG. 14 illustrates a step in which ceramic materials 38 are filled into the recesses 37 by a sputtering process. In this state, the ceramic 38 is plated on the entire surface with which a magnetic tape comes in to contact.

Next, the bonded block is cut as designated by dotted lines so that a plurality of magnetic head cores each of which has a thickness of T are obtained.

Then, the surface, with which the magnetic tape comes into contact, is lapped by a grinding tape to the gap depth d so as to obtain a desired cylindrical shape while removing unnecessary ceramic parts. As a result, the magnetic head such as being shown in FIG. 1 is manufactured. If the direction, in which the magnetic core blocks 40 and 50 are cut, is arranged to make an angle to the abutment surface, a magnetic head for azimuth recording can be obtained.

Although a specific example of the manufacturing method is described in accordance with its sequential order, it can be varied. For example, the step (vii), in which the track width defining grooves are formed, may be performed before the step (vi) in which the grinding work to form a cylindrical shape is performed. Furthermore, step (vi) may be performed after the step (viii) in which the ceramics 38 is plated.

As will be apparent from the above, the present invention is arranged in such a manner that inclined surfaces at which the two core bodies abut against each other. Furthermore, the metal magnetic film is formed on the inclined surface and the inner surface of the coil wire winding aperture before the two core base bodies are coupled to each other via the gap material. Subsequently, the track width portion is formed on the surface of the magnetic core with which a magnetic tape comes into contact. Thus, a magnetic head exhibiting an accurate track width can be obtained regardless of ununiform groove pitches or the thickness of the metal magnetic films.

Furthermore, the ceramics is filled in the recesses formed on the both sides of the track after the track width portion has been formed as described above. Therefore, the generation of bubbles and the breakage and chipping at the time of the cutting work for forming the core shape can be satisfactorily prevented in comparison to the structure in which glass or the like is filled. In particular, since forsterite ($2MgO-SiO_2$) or steatite ($MgO-SiO_2$) are the ceramic materials that have the substantially the same thermal expansion coefficient as that of Mn-Zn ferrite or $\alpha$-$Fe_2O_3$ which is employed to make the core base body, a problem of breakage or peeling can be overcome. In addition, since characteristics of easy wearing in comparison to the core base body when the magnetic tape slides is realized, an excellent tape touch can be obtained while preventing ununiform wear. Another effect can be obtained from some reason in that excellent tape running characteristics can be obtained when a coating type magnetic tape or an evaporated tape is used.

Furthermore, recesses are formed in the portion of the surface with which the magnetic tape comes in contact other than in the track width portion and the ceramic is then filled in the thus formed recesses. Therefore, the generation of the cross-talk from the neighboring track or the next track to this neighboring track due to the presence of the magnetic material positioned outside the track width can be prevented. In addition, according to this example, it can be achieved that the optical width of the track (the effective width of the track at the time of the recording operation and the reproducing operation).

According to the present invention, the process of manufacturing the magnetic head can be simplified and the manufacturing yield can be significantly improved.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A magnetic head comprising:

a pair of nonmagnetic core base bodies coupled to each other in such a manner that amorphous magnetic alloy films are applied to their abutment surfaces and a gap layer is interposed in a magnetic gap portion of the magnetic head, the amorphous magnetic alloy films applied to the core base bodies being made abut against each other at their end edge surfaces each of which has a width larger than its film thickness, and at least one of the core base bodies having a coil winding groove formed at a portion at which the nonmagnetic core base bodies are coupled to each other wherein:

surface layer portions of each of the core base bodies, with which a magnetic tape comes in contact, is removed along a direction, in which the magnetic tape moves, to a depth which- is substantially the same as the depth of the magnetic gap while leaving a widthwise portion, which is the same as the track width defined by the width of contact between the two end edge surfaces of the amorphous magnetic alloy films, at the widthwise center of the core base bodies, two recesses which are formed by removing the surface layer portions being filled with one of forsterite ($2MgO-SiO_2$) and steatite ($MgO-SiO_2$); and another amorphous magnetic alloy film is also applied to the surface of the coil winding groove which defines a coil winding aperture and the latter amorphous magnetic alloy film is integrally continued to the former amorphous magnetic alloy films applied to the abutment surfaces.

2. A magnetic head according to claim 1 wherein the abutment surfaces of the pair of nonmagnetic core base bodies, to which the amorphous magnetic alloy films are applied, are arranged to form inclined surfaces extending along the entire length in the lengthwise direction of the surfaces.

* * * * *